(12) United States Patent
Kobayashi (10) Patent No.: US 7,710,660 B2
(45) Date of Patent: May 4, 2010

(54) LENS BARREL AND IMAGING APPARATUS

(75) Inventor: Futoshi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 12/169,840

(22) Filed: Jul. 9, 2008

(65) Prior Publication Data

US 2009/0034074 A1    Feb. 5, 2009

(30) Foreign Application Priority Data

Aug. 3, 2007    (JP) .............................. 2007-203032

(51) Int. Cl.
*G02B 15/14* (2006.01)
*G02B 7/02* (2006.01)

(52) U.S. Cl. ...................................... 359/694; 359/823
(58) Field of Classification Search ................ 359/694, 359/699, 700, 819, 821–823
See application file for complete search history.

(56) References Cited

U.S. PATENT DOCUMENTS 5,410,432 A * 4/1995 Kobayashi .................. 359/740
7,031,075 B2 * 4/2006 Tsuji .......................... 359/694
7,050,244 B2 * 5/2006 Hayashi et al. ............. 359/701
2005/0128603 A1   6/2005 Tsuji

FOREIGN PATENT DOCUMENTS

JP    2005-173413 A    6/2005

\* cited by examiner

*Primary Examiner*—Mohammed Hasan
(74) *Attorney, Agent, or Firm*—Canon U.S.A., Inc. I.P. Division (57) ABSTRACT

A lens barrel includes a first holding member configured to hold a lens, a second holding member configured to hold the first holding member, a protection member located at an object side of the lens in an openable and closable manner and configured to protect the lens when in a closed state, and a drive member configured to open and close the protection member. The first holding member includes an adjustment surface configured to support the first holding member rotatable with respect to the second holding member around a point located on an optical axis of the lens. The drive member is located such that the drive member overlaps the first holding member as viewed from an optical axis direction of the lens.

8 Claims, 10 Drawing Sheets

LENS BARREL AND IMAGING APPARATUS

BACKGROUND OF THE INVENTION

1. Field of the Invention

The present invention relates to a lens barrel having a lens adjustment mechanism and a lens protection function, and an imaging apparatus with the lens barrel.

2. Description of the Related Art

In a lens barrel with an optical system including a plurality of optical units, such as a zoom lens, inclinations of the optical units with respect to an optical axis may cause a deterioration of optical performance. In view of the above, in order to decrease a deterioration of optical performance, such a lens barrel that has an inclination adjustment mechanism that adjusts an inclination of, for example, a first optical unit has been discussed in Japanese Patent Application Laid-Open No. 2005-173413.

The lens barrel as discussed in Japanese Patent Application Laid-Open No. 2005-173413, however, includes no protection member that protects a lens under a condition that an imaging apparatus is stored, such that the lens may be damaged, get dusty or be stained on a lens surface thereof.

While there is one in which a cover member that covers a surface of the lens facing to an object side is fit into a lens barrel to protect the lens during a storage state of the imaging apparatus, manipulation is troublesome since a user is required to remove the cover member having fit into the lens barrel when the user uses the imaging apparatus. Further, the user is required to keep the removed cover member or to connect the cover member to the imaging apparatus with a string or the like, such that managing the removed cover member is troublesome.

Another conventional example of the lens barrel with a cover member includes one in which a sliding cover member is provided on an apparatus body of the imaging apparatus to power on/off the imaging apparatus according to a slide position of the sliding cover member.

Since the above conventional example requires rail portions for supporting the sliding cover member and a retaining mechanism for retaining the cover member while keeping the cover member closed or open, the imaging apparatus becomes larger.

SUMMARY OF THE INVENTION

The present invention is directed to a lens barrel capable of decreasing deterioration of optical performance as well as decreasing trouble in using an imaging apparatus, and further capable of preventing the lens barrel from increasing in size in a radial direction, and to an imaging apparatus with the lens barrel.

According to an aspect of the present invention, a lens barrel includes a first holding member configured to hold a lens, a second holding member configured to hold the first holding member, a protection member located at an object side of the lens in an openable and closable manner and configured to protect the lens when in a closed state, and a drive member configured to open and close the protection member. The first holding member includes an adjustment surface configured to support the first holding member rotatable with respect to the second holding member around a point located on an optical axis of the lens. The drive member is located such that the drive member overlaps the first holding member as viewed from an optical axis direction of the lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the accompanying drawings.

Figure 1:
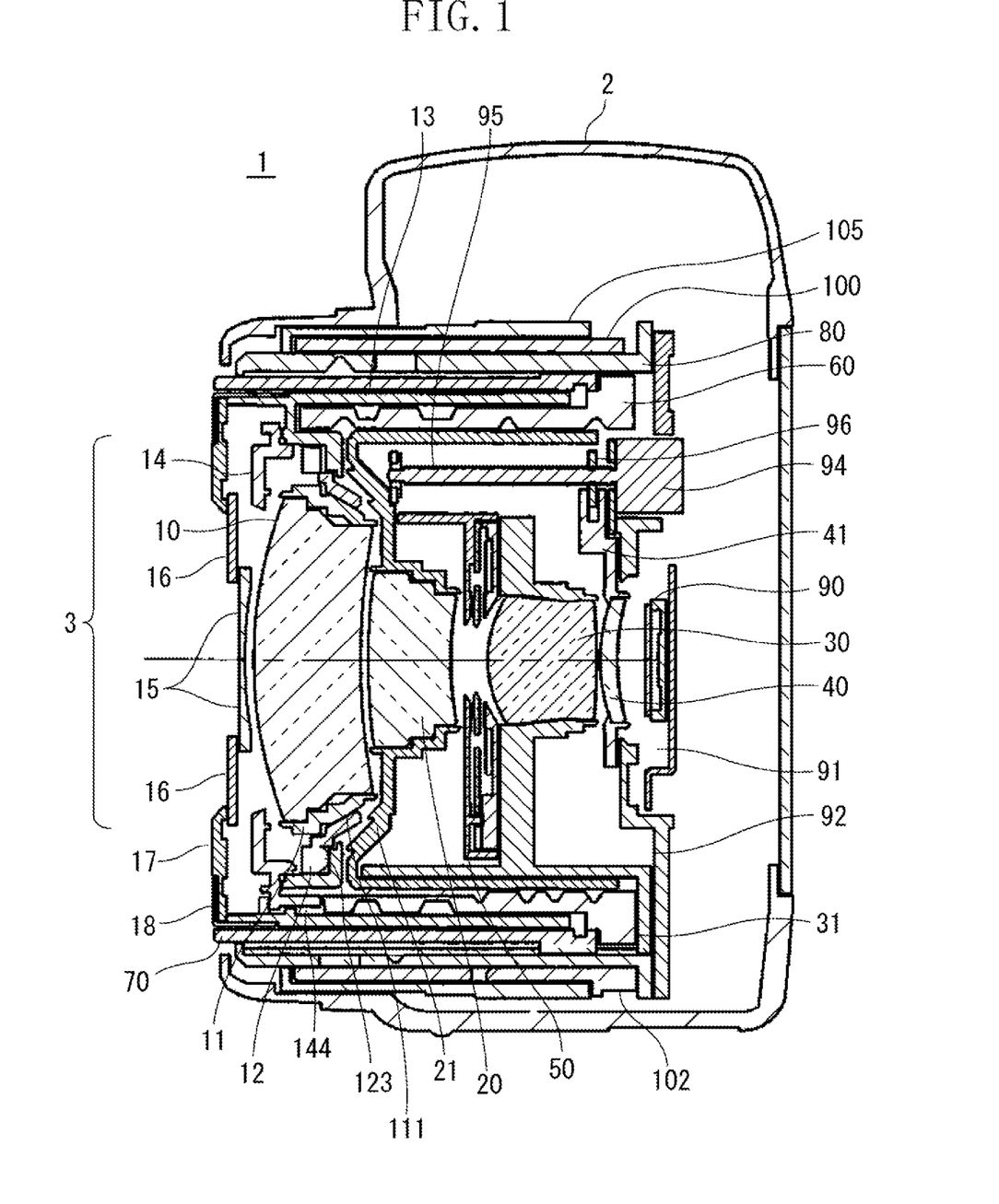
FIG. 1 is a cross sectional view of an example camera with a lens barrel (in a retracted state) according to an exemplary embodiment of the present invention.
Figure 2:
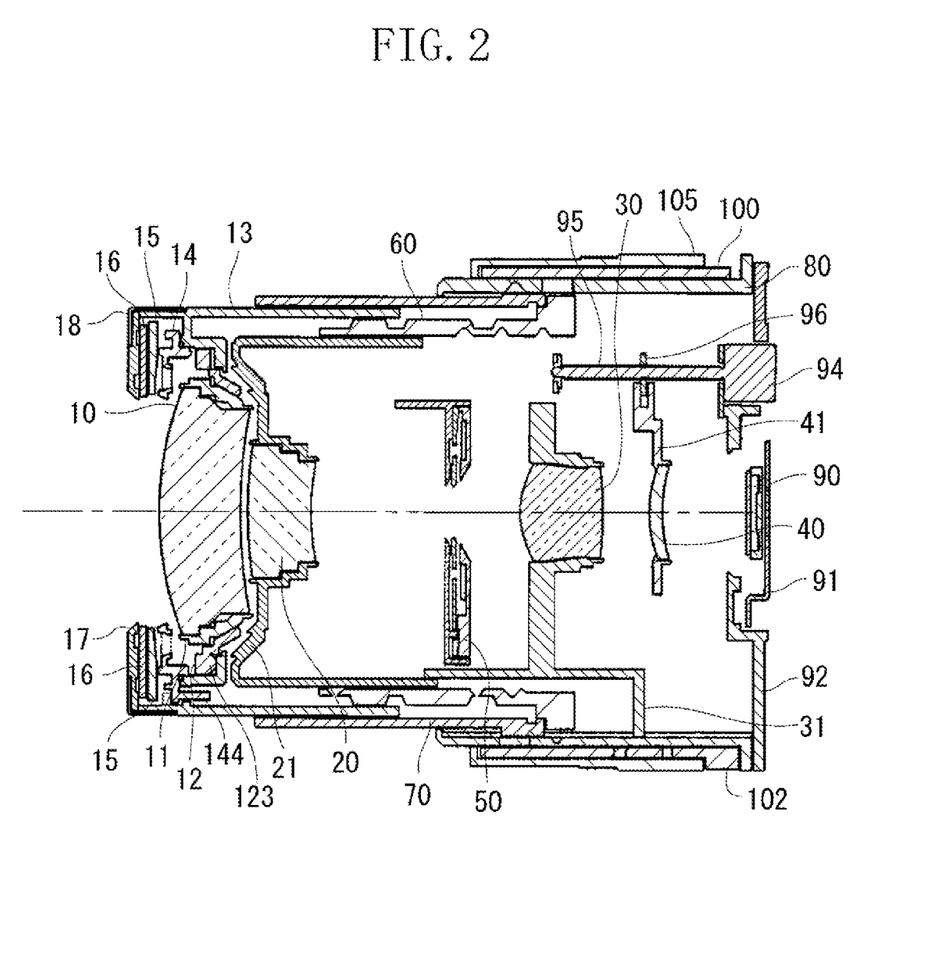
FIG. 2 is a cross sectional view illustrating a wide-angle state of the lens barrel illustrated in FIG. 1.
Figure 3:
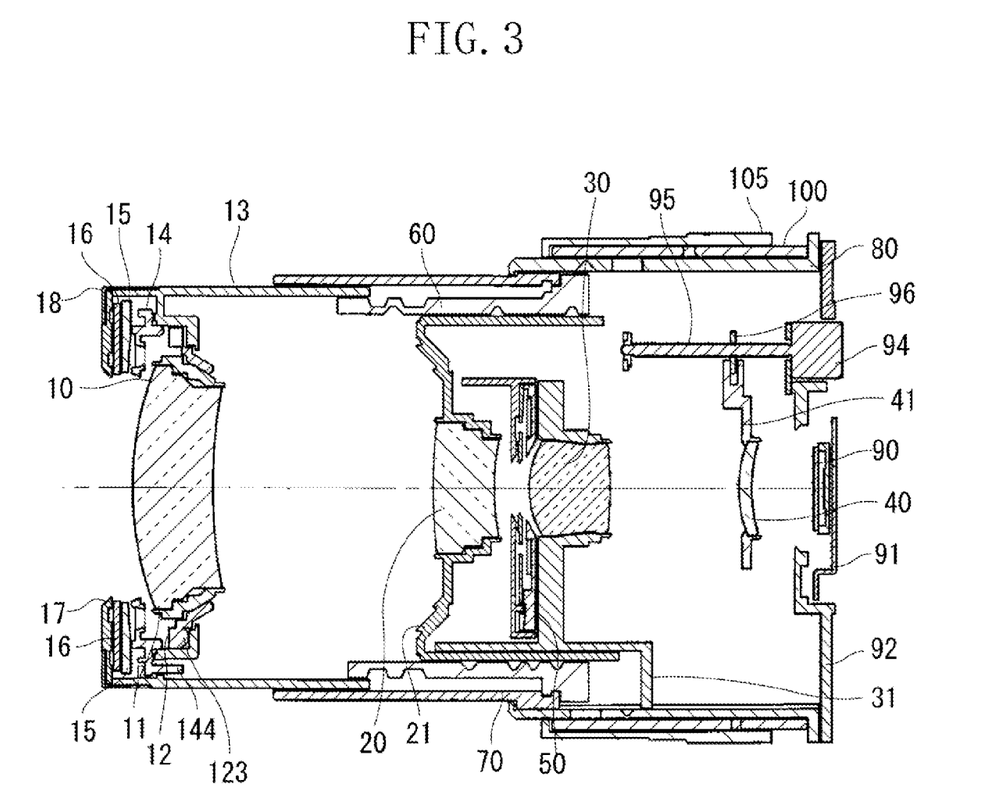
FIG. 3 is a cross sectional view illustrating a telephoto state of the lens barrel illustrated in FIG. 1.

FIG. 1 is a cross sectional view of a camera with a lens barrel (in a retracted state) according to an exemplary embodiment of the present invention. FIG. 2 is a cross sectional view of the lens barrel illustrated in FIG. 1 in a wide-angle state. FIG. 3 is a cross sectional view of the lens barrel illustrated in FIG. 1 in a telephoto state.

As illustrated in FIG. 1, the camera (imaging apparatus) 1 includes a camera body 2, which holds a lens barrel 3. The lens barrel 3 includes a four-unit optical system. The four-unit optical system includes a first lens unit 10, a second lens unit 20, a third lens unit 30, and a fourth lens unit 40, which are arranged from an object side to an image plane side in this order.

The first lens unit 10 is held integrally with a first lens unit holder (first holding member) 11. The first lens unit holder 11 includes a spherical surface portion 111 (see also FIG. 4) on an outer circumference portion thereof. The spherical surface portion 111 corresponds to a portion of a supposed sphere having the center on an optical axis of the optical system.

The spherical surface portion 111 is located inside the outermost circumferential surface of the first lens unit 10 in a radial direction with the use of the difference in diameter in an optical axis direction of the first lens unit 10 when the lens barrel 3 is viewed from the optical axis direction. Such an arrangement enables a down sizing of the first lens unit barrel 13 in a radial direction.

The first lens unit holder 11 is held such that the spherical surface portion 111 contacts a conical portion 121 (see FIG. 4) provided on an inner circumference portion of a first lens unit adjustment moving ring (second holding member) 12. The diameter of the conical portion 121 becomes smaller at a certain ratio toward the image plane side in the optical axis direction.

Accordingly, the first lens unit holder 11 can be provided in a freely inclined manner with respect to the first lens unit adjustment moving ring 12 around the center of the spherical surface portion 111.

A contact portion between the spherical surface portion 111 and the conical portion 121 forms a circle around the optical axis. The circle always lies at the same position of the conical portion 121 regardless of the inclination of the first lens unit holder 11.

Figure 4:
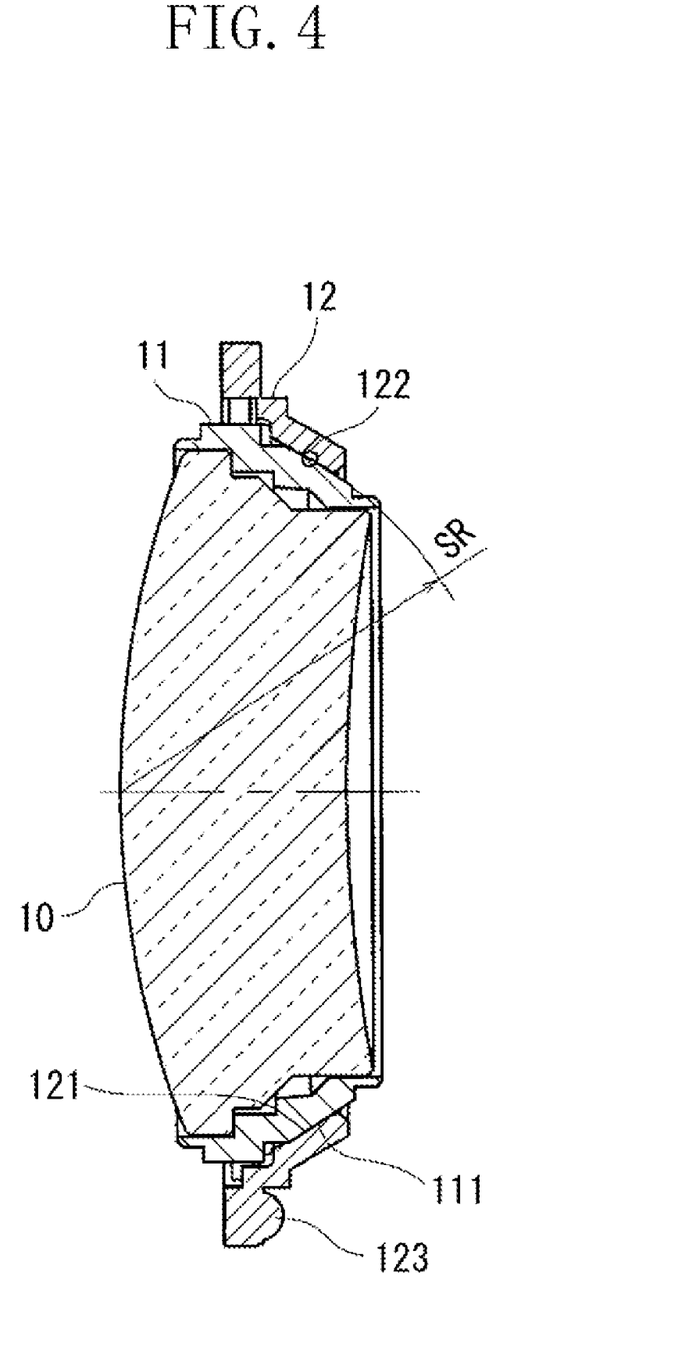
FIG. 4 is a cross sectional view of a first lens unit holder, which is a part of the lens barrel illustrated in FIG. 1.

FIG. 4 is a cross sectional view illustrating a relationship between the first lens unit holder 11 and the first lens unit adjustment moving ring 12. In FIG. 4, point 122 indicates a cross-section position of the above-described circle.

As is apparent from the position of point 122 illustrated in FIG. 4, the spherical surface portion 111 and the conical portion 121 are arranged such that the circle is located inside the outermost circumferential surface of the first lens unit 10 when the lens barrel 3 is viewed from the optical axis direction.

Figure 5:
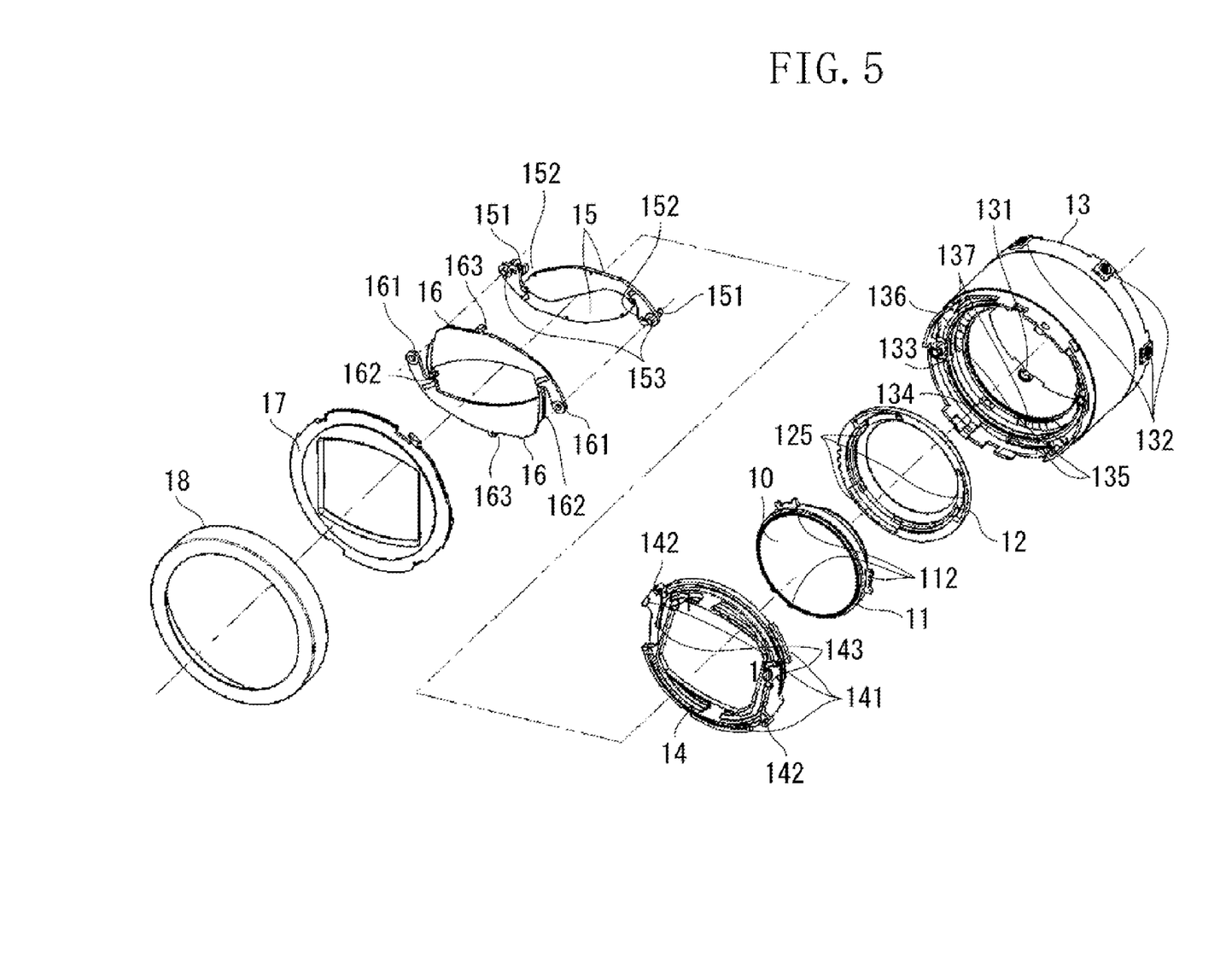
FIG. 5 is an exploded perspective view of a lens barrier and a first lens unit adjustment mechanism, which are parts of the lens barrel illustrated in FIG. 1.

FIG. 5 is an exploded perspective view of a first lens unit barrel (third holding member) 13. The first lens unit barrel 13 is provided with stages 137 including five fan-shaped planes, each plane being placed differently in the optical axis direction. The stages 137 are arranged at three positions at even intervals on the circumference of the first lens unit barrel 13 having the center on the optical axis.

Referring back to FIG. 1, the first lens unit adjustment moving ring 12 is provided with spherical projections 123 such that the spherical projections 123 contact the respective stages 137 at ends of the spherical projections 123. Although not illustrated, the spherical projections 123 are also arranged at three positions at even intervals on the circumference of the first lens unit adjustment moving ring 12 having the center on the optical axis. Contact of the spherical projections 123 with the three stages 137 enables the outer circumference portion of the first lens unit adjustment moving ring 12 to be held with respect to the first lens unit barrel 13.

The outer circumference portion of the first lens unit adjustment moving ring 12 fits into the inner circumference portion of the first lens unit barrel 13. The first lens unit adjustment moving ring 12 can rotate around the optical axis with respect to the first lens unit barrel 13.

Accordingly, since the positions of the stages 137 which the spherical projections 123 contact can be changed, the position of the first lens unit adjustment moving ring 12 with respect to the first lens unit barrel 13 in the optical axis direction can be selected from among five stages according to the five planes of the stages 137. Even if the first lens unit adjustment moving ring 12 rotates, the relationship between the spherical surface portion 111 and the conical portion 121 remains unchanged, such that an operation of inclining the position of the first lens unit holder 11 and an operation of changing the position of the first lens unit adjustment moving ring 12 in the optical axis direction can be performed independently.

While the adjustment of inclining the first lens unit holder 11 and the change of the position of the first lens unit adjustment moving ring 12 in the optical axis direction will be described below, the first lens unit holder 11 after adjusting the inclination thereof and the first lens unit adjustment moving ring 12 after changing the position thereof are fixed to the first lens unit barrel 13 by an adhesive.

A second lens unit barrel 21 holds a second lens unit 20. Similarly, a third lens unit barrel 31 holds a third lens unit 30, and a fourth lens unit barrel 41 holds a fourth lens unit 40. A diaphragm unit 50 having a diaphragm function and a shutter function is arranged between the second lens unit 20 and the third lens unit 30.

The optical system in the present embodiment forms an object image on an image sensor 90. The image sensor 90 photoelectrically converts the object image. The image sensor 90 is held on an image sensor holding plate 91 by an adhesive or the like. The image sensor holding plate 91 is fixed to an image sensor holder 92 by screws or the like.

Figure 6:
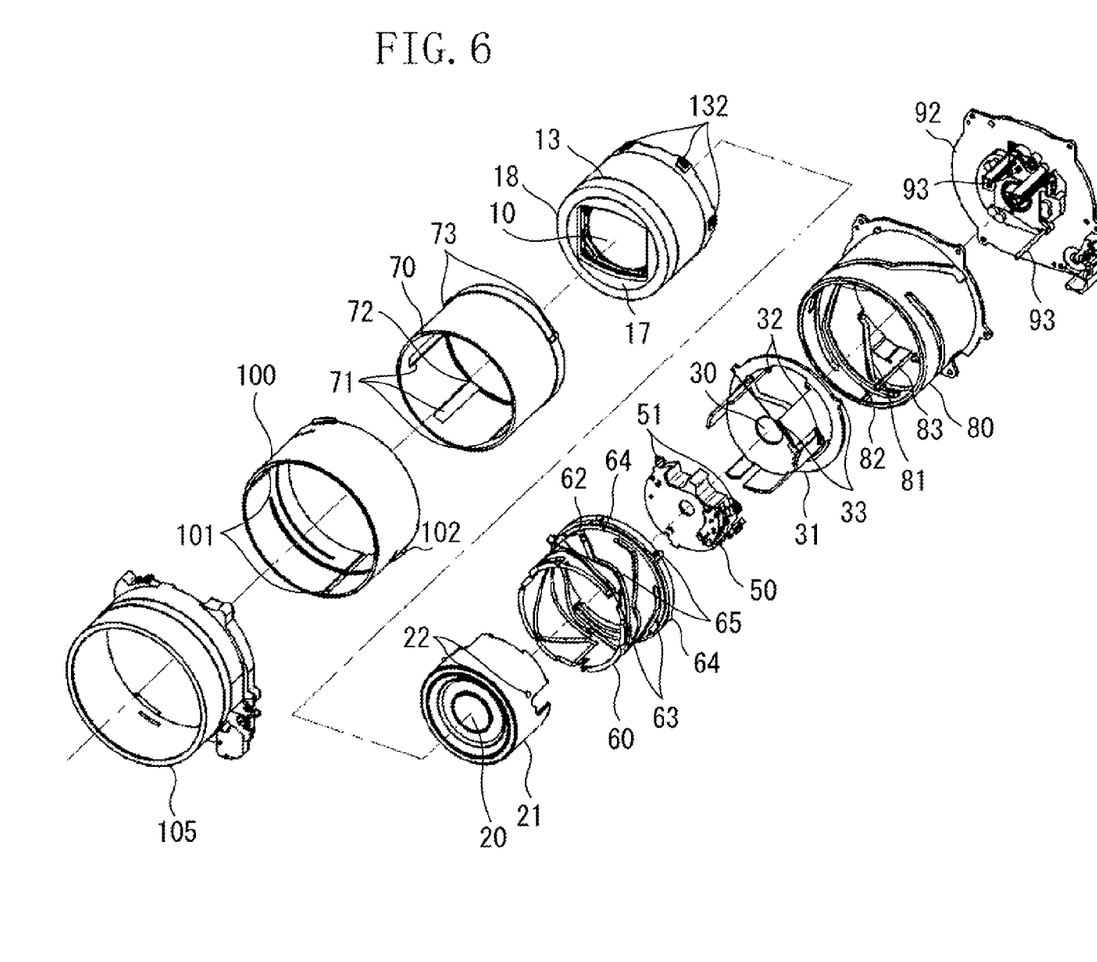
FIG. 6 is an exploded perspective view of the lens barrel illustrated in FIG. 1.

FIG. 6 is an exploded perspective view of the lens barrel 3. As illustrated in FIG. 6, the image sensor holder 92 is provided with two fourth lens unit guide bars 93, by which the fourth lens unit barrel 41 (see FIG. 3) is supported to be movable in the optical axis direction.

A fourth lens unit motor 94 is held by the image sensor holder 92, and a screw 95 provides a forward or reverse rotation, as required, as the fourth lens unit motor 94 receives power from the camera system. A nut 96 screw-fits with the screw 95. The fourth lens unit barrel 41 can be driven in the optical axis direction by the rotation of the fourth lens unit motor 94 since the nut 96 is supported to be unrotatable with respect to the fourth lens unit barrel 41.

Figure 8:
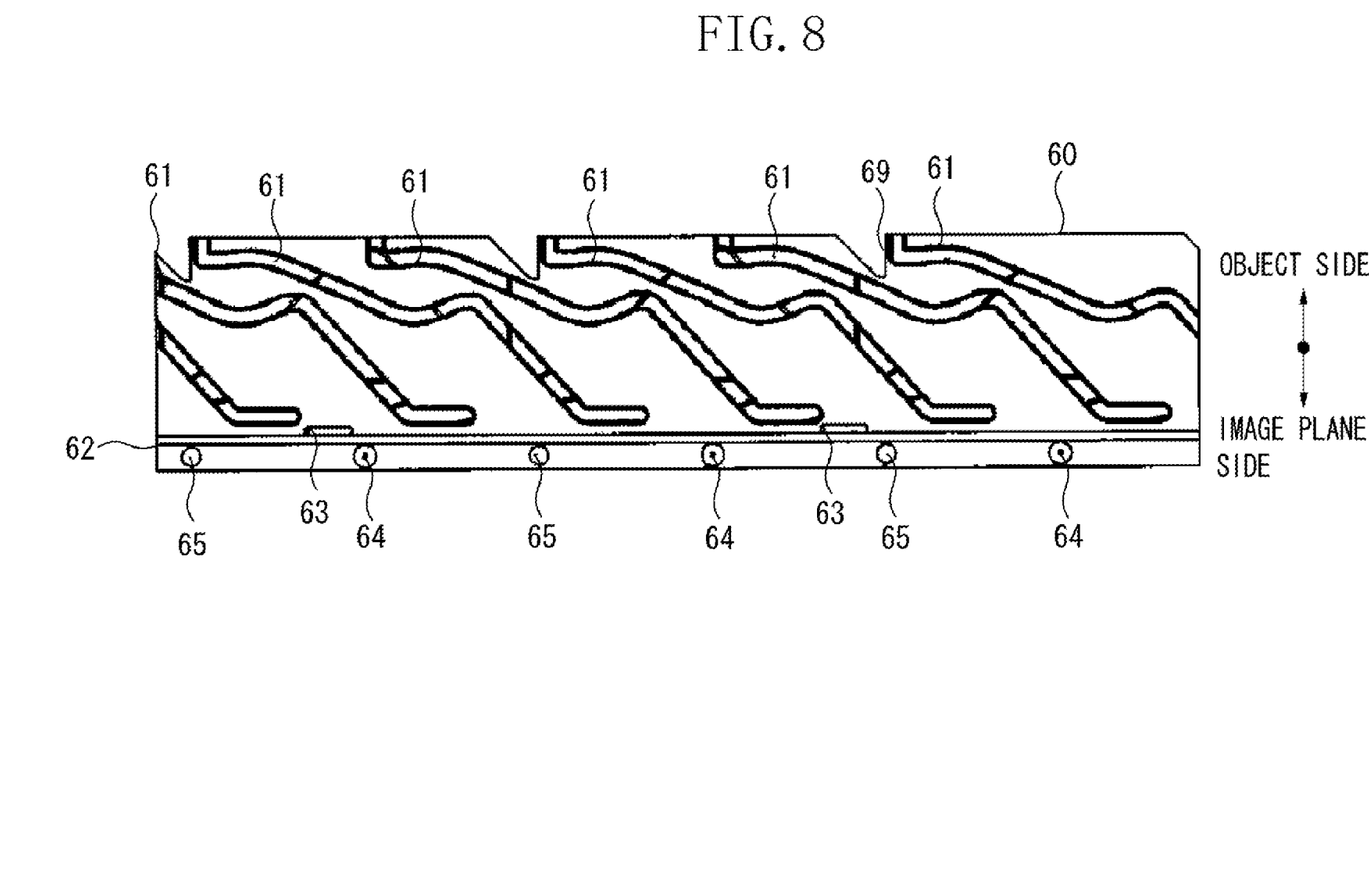
FIG. 8 is a development view of an outer circumferential surface of a moving cam ring, which is a part of the lens barrel illustrated in FIG. 1.

The first lens unit barrel 13 has a cylindrical shape and includes, at an inner diameter side thereof, six first lens unit followers 131 (see FIG. 5) equally spaced in a circumferential direction. FIG. 8 is a development view of an outer circumferential surface of a moving cam ring 60. The moving cam ring 60 has a cylindrical shape and includes, at an outer diameter side thereof, six first lens unit cam grooves 61, into which the first lens unit followers 131 cam-fit, respectively.

The first lens unit followers 131 are press-fit into the first lens unit barrel 13. By providing first lens unit keys 132 (see FIG. 5) to project outwardly in the radial direction from the first lens unit barrel 13 at phases where the first lens unit followers 131 are arranged, the length of each of the first lens unit followers 131 to be press-fit into the first lens unit barrel 13 can be made longer.

Accordingly, a sufficient press-fit force of the first lens unit followers 131 can be obtained. Therefore, the first lens unit keys 132 are provided at six portions at even intervals on the outer circumference of the first lens unit barrel 13.

A first lens unit rectilinear guide tube 70 has a cylindrical shape and includes, at an inner circumference portion thereof, first lens unit key grooves 71 (see FIG. 6), which are engaged with the first lens unit keys 132 respectively and guide the first lens unit keys 132 only in the optical axis direction, such that the first lens unit key grooves 71 are provided at six portions of the inner circumference portion of the first lens unit rectilinear guide tube 70 in a manner respectively corresponding to the first lens unit keys 132.

The moving cam ring 60 has a cylindrical surface 62 (see FIGS. 6 and 8), which engages with an inner surface of the first lens unit rectilinear guide tube 70. By engagement of the inner surface of the first lens unit rectilinear guide tube 70 with the cylindrical surface 62, the moving cam ring 60 and the first lens unit rectilinear guide tube 70 engage with each other in a relative rotatable manner.

Also, the first lens unit rectilinear guide tube 70 has, at an inner circumference portion thereof, a groove 72 that is parallel with a surface orthogonal to the optical axis. The projections 63 of the moving cam ring 60 are fit into the groove 72. With the so-called bayonet fitting, the moving cam ring 60 and the first lens unit rectilinear guide tube 70 are integrally movable in the optical axis direction.

A stationary cam ring 80 is a cylindrical body fixed to the image sensor holder 92 and is arranged at an outer circumference side of the moving cam barrel 60.

Figure 10:
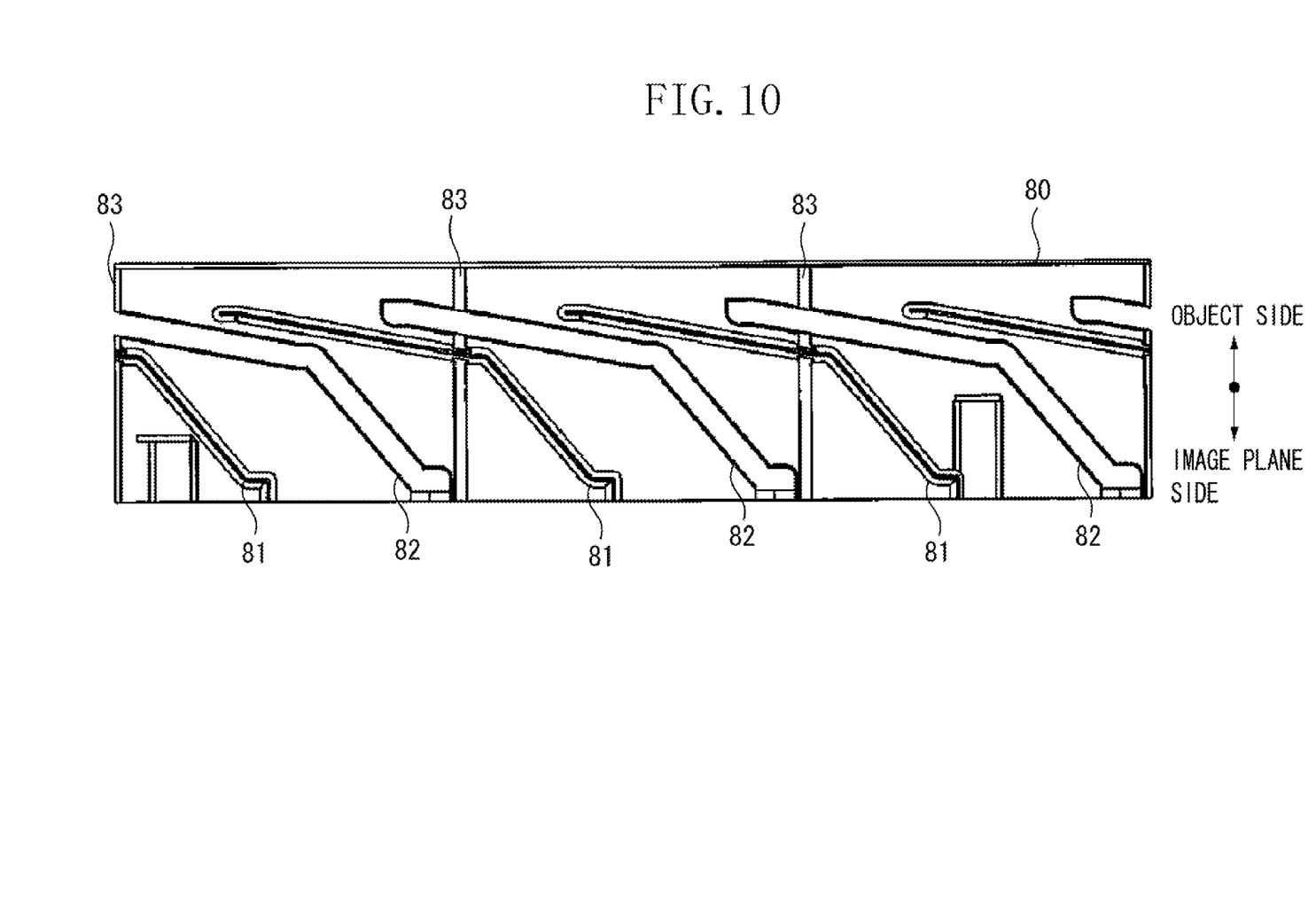
FIG. 10 is a development view of an inner circumferential surface of a stationary cam ring, which is a part of the lens barrel illustrated in FIG. 1.

FIG. 10 is a view of an inner circumferential surface of the stationary cam ring 80. As illustrated in FIG. 10, the inner circumference portion of the stationary cam ring 80 is provided with bottomed cam grooves 81, which engage with the cam followers 64 provided on the outer circumference portion of the moving cam ring 60 at three portions equally spaced.

Cam through-holes 82, which have cam traces identical to those of the cam grooves 81 and pass through the inner and the outer circumferential surfaces of the stationary cam ring 80, receive cylindrical projections 65 (see FIG. 6), which project outwardly in the radial direction at three portions on the outer circumference portion of the moving cam ring 60.

A drive ring 100 is a cylindrical body that engages with an outer circumference portion of the stationary cam ring 80. An inner circumferential side of the drive ring 100 is provided with drive grooves 101, which are parallel with the optical axis and have a constant width. The drive grooves 101 engage with the cylindrical projections 65 of the moving cam ring 60, which project from the outer circumference portion of the stationary cam ring 80.

The drive ring 100 is provided with a gear 102, to which a driving force from a not-shown driving source is transmitted via a train of gears according to a command from the camera system, thereby providing a forward or rearward rotation of the drive ring 100 as required.

According to the rotation of the drive ring 100, the cylindrical projections 65 are pushed by the drive grooves 101 to allow rotation of the moving cam ring 60. Since the moving cam ring 60 is in engagement with the stationary cam ring 80, the moving cam ring 60 moves forward or rearward in the optical axis direction according to the rotation of the moving cam ring 60 while following the cam grooves 81.

The outer circumference portion of the first lens unit rectilinear guide tube 70 is provided with rectilinear keys 73 (see FIG. 6), which have a constant width in the optical axis direction and which are arranged at three portions at even intervals on the circumference. On the other hand, the stationary cam ring 80 includes key grooves 83, which receive the corresponding rectilinear keys 73 and are parallel with the optical axis.

Accordingly, while the moving cam ring 60 moves in the optical axis direction with rotating, the first lens unit rectilinear guide tube 70 moves in the optical axis direction together with the moving cam ring 60 without rotating.

Also, the first lens unit barrel 13 does not rotate since the first lens unit keys 132 are in engagement with the first lens unit key grooves 71 of the first lens unit rectilinear guide tube 70. However, since the first lens unit cam grooves 61, with which the first lens unit followers 131 are in engagement, rotate, cam engagement portions of the first lens unit cam grooves 61 move according to the rotation. Thus, according to the rotation of the moving cam ring 60, the first lens unit barrel 13 moves in the optical axis direction.

The inner circumference portion of the moving cam ring 60 includes cam grooves configured to move the diaphragm unit 50, the third lens unit barrel 31, and the second lens unit barrel 21 in the optical axis direction.

Figure 9:
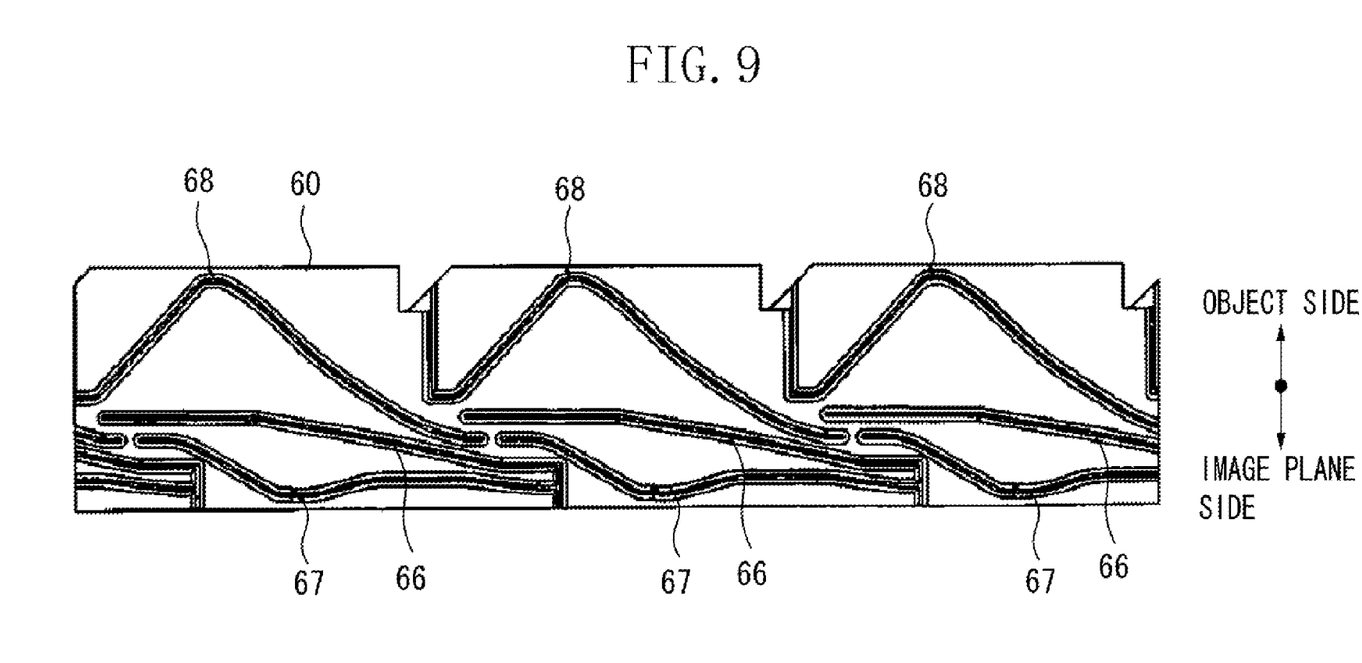
FIG. 9 is a development view of an inner circumferential surface of the moving cam ring, which is a part of the lens barrel illustrated in FIG. 1.

FIG. 9 is a development view of the inner circumferential surface of the moving cam ring 60. In FIG. 9, diaphragm cams 66 engage with the diaphragm followers 51 provided at three portions at even intervals on the circumference of the diaphragm unit 50. The third lens unit cams 67 engage with the third lens unit followers 32 provided at three portions at even intervals on the circumference of the third lens unit barrel 31. The second lens unit cams 68 engage with the second lens unit followers 22 provided at three portions at even intervals on the circumference of the second lens unit barrel 21.

A flange portion of the image plane side of the third lens unit barrel 31 is provided with third lens unit keys 33 (see FIG. 6) at three portions at even intervals on the circumference of the flange portion. The width of each of the third lens unit keys 33 is identical to the width of each of the rectilinear keys 73 of the first lens unit rectilinear guide tube 70, and the third lens unit keys 33 fit into the key grooves 83 of the stationary cam ring 80. In other words, the third lens unit barrel 31 is guided to move straight in the optical axis direction since the third lens unit keys 33 is in engagement with the key grooves 83 of the stationary cam ring 80.

On the other hand, since the third lens unit cam grooves 67, with which the third lens unit followers 32 are in engagement, rotate, the cam engagement portions of the third lens unit cam grooves 67 move according to the rotation. Accordingly, as the moving cam ring 60 rotates, the third lens unit barrel 31 moves in the optical axis direction while following the movement of the cam.

Figure 7:
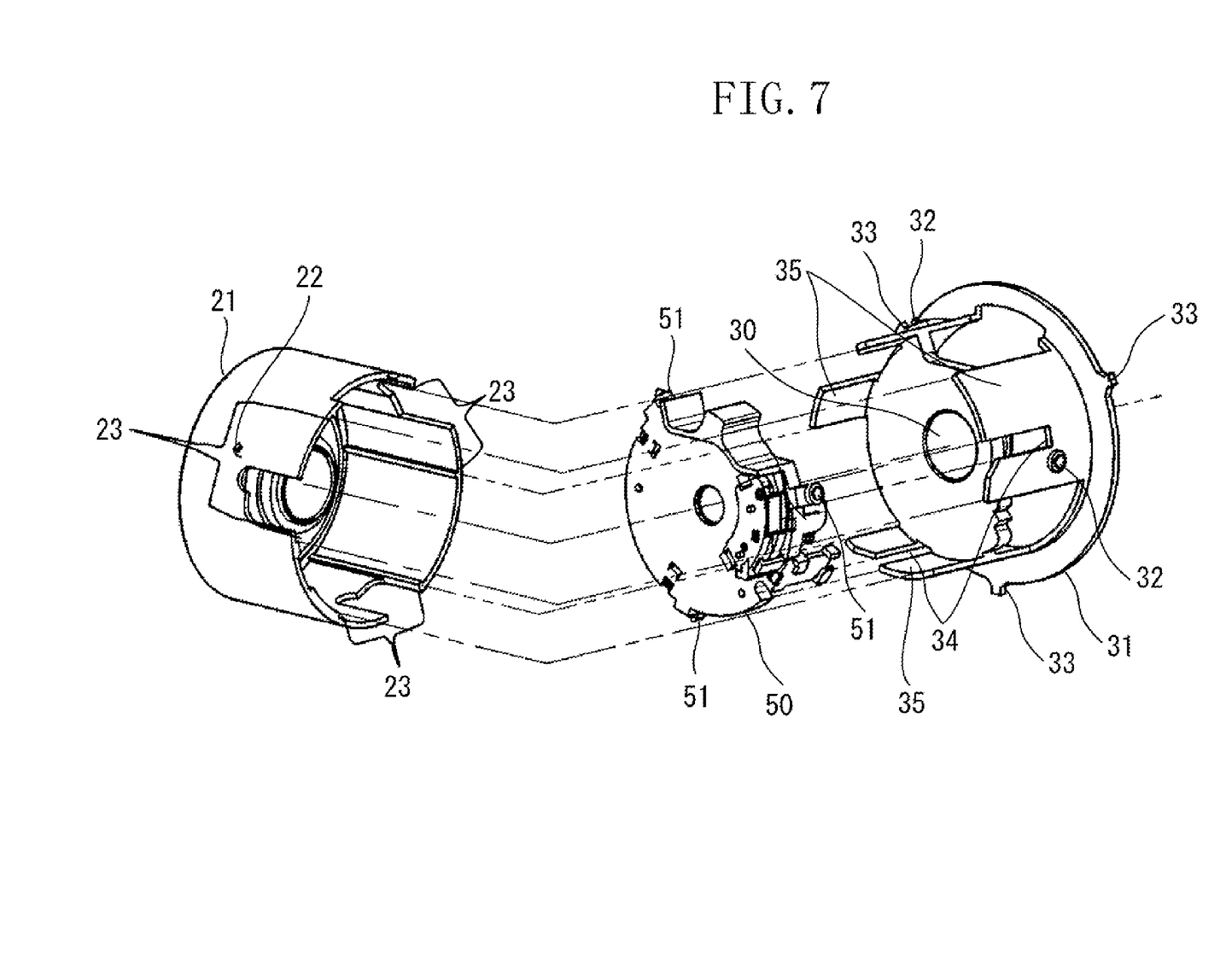
FIG. 7 is an exploded perspective view of a second lens unit barrel and a third lens unit barrel, which are parts of the lens barrel illustrated in FIG. 1, for illustrating a relationship therebetween.

FIG. 7 is an exploded perspective view illustrating a relationship between the second lens unit barrel 21, the third lens unit barrel 31, and the diaphragm unit 50.

As illustrated in FIG. 7, diaphragm followers 51 of the diaphragm unit 50 are provided with cylindrical column shapes coaxial with the diaphragm followers 51. The cylindrical columns fit into key slits 34, which are provided in the third lens unit barrel 31 and which are parallel with the optical axis.

Accordingly, without relative rotation of the diaphragm unit 50 and the third lens unit barrel 31 around the optical axis, they can be moved relative to each other in the optical axis direction. According to the rotation of the moving cam ring 60, the diaphragm cam grooves 66, with which the diaphragm followers 51 are in engagement, rotate to move the cam engagement portions between the diaphragm followers 51 and the diaphragm cam grooves 66, such that the diaphragm unit 50 can be moved in the optical axis direction according to the cams.

The inner circumference portion of the second lens unit barrel 21 includes three guide grooves 23, which are parallel with the optical axis and which have a constant width. Guide walls 35, which are provided on the third lens unit barrel 31 and which are parallel with the optical axis, fit into the guide grooves 23.

Accordingly, without relative rotation between the second lens unit barrel 21 and the third lens unit barrel 31 around the optical axis, they can be moved relative to each other in the optical axis direction.

According to the rotation of the moving cam ring 60, the second lens unit cam grooves 68, with which the second lens unit barrel 21 is in engagement, rotate to move the cam engagement portions between the second lens unit followers 22 and the second lens unit cam grooves 68. Thus, the second lens unit barrel 21 can be moved in the optical axis direction according to the cams.

A protection tube 105 is a cylindrical body that holds the stationary cam ring 80 to sandwich the stationary cam ring 80 between the protection tube 105 and the image sensor holder 92. The protection tube 105 restricts movement of the drive ring 100 in the optical axis direction and covers the drive ring 100 to protect the drive ring 100 inside the camera body 2.

Although not illustrated, the protection tube 105 has the function of holding a motor, which serves as a driving source of the moving cam ring 60, and a reduction gear train, which reduces the rotation speed of the motor to be transmitted to the gear 102 of the drive ring 100.

Next, an adjustment to incline the first lens unit holder 11 and a change of the position of the first lens unit adjustment moving ring 12 in the optical axis direction will be described below.

Initially, the position of the first lens unit adjustment moving ring 12 in the optical axis direction is determined based on a focus position or the like. As described above, the first lens unit adjustment moving ring 12 is rotated around the optical axis such that the spherical projections 123 of the first lens unit adjustment moving ring 12 contact the optimum planes among the five planes of the stages 137 of the first lens unit barrel 13.

Since the contact portions between the spherical projections 123 and the stages 137 cannot be seen from outside, the planes (rotational positions) to be used are selected by selectively adjusting positions of indexes (not shown) of the first lens unit adjustment moving ring 12 to those of indexes 133 of the first lens unit barrel 13.

The first lens unit adjustment moving ring 12 includes three holes 125, and the first lens unit barrel 13 is provided with projections 134 to correspond to positions of the holes 125. Tabs 112 provided at three portions of the first lens unit holder 11 loosely fit to the projections 134 of the first lens unit barrel 13.

In this state, the inclination of the first lens unit 10 with respect to the optical axis can be adjusted by pushing or pulling the periphery of the first lens unit holder 11. After the desirable adjustment has been done, an adhesive is made to flow into each of the three holes 125 of the first lens unit adjustment moving ring 12. Thus, the tabs 112, the holes 125, and the first lens unit barrel 13 are securely bonded to one another.

Next, with reference to FIG. 5, a lens barrier, which covers the first lens unit 10 when the lens barrel is in the retracted state, will be described below.

As illustrated in FIG. 5, the lens barrier of the lens barrel according to the present embodiment includes a barrier drive ring (drive member) 14, a pair of inner barrier blades (protection member) 15, a pair of outer barrier blades (protection member) 16, a barrier cover 17, and a barrier cap 18.

The barrier drive ring 14 engages with the inner circumferential surface of the first lens unit barrel 13 and is rotatable therein. Fitting portions between the first lens unit adjustment moving ring 12 and the first lens unit barrel 13 are arranged at the same positions as fitting portions between the barrier drive ring 14 and the first lens unit barrel 13, or are arranged at positions inside the fitting portions between the barrier drive ring 14 and the first lens unit barrel 13, when viewed from the optical axis direction.

Flange portions 141 provided on the outer circumference portion of the barrier drive ring 14 are inserted between flat projections 135, which project inwardly in the radial direction from the inner circumferential surface of the first lens unit barrel 13, and a rail 136, which serves as a contact surface of the first lens unit barrel 13 with respect to the barrier drive ring 14 in the optical axis direction, thus establishing bayonet fitting. Accordingly, the barrier drive ring 14 is supported to be rotatable with respect to the first lens unit barrel 13. The flange portions 141 are located outside the fitting portions between the barrier drive ring 14 and the first lens unit barrel 13.

In the barrier drive ring 14, not-shown springs (elastic members) are hooked onto spring hooks (elastic member holders) 142 to bias the lens barrel 3 in the counterclockwise rotation direction when viewed from the object side. The spring hooks 142 are located outside the fitting portions between the barrier drive ring 14 and the first lens unit barrel 13.

The pair of inner barrier blades 15 has shafts 151 (rotation center), which are inserted into shaft bearings (not shown) of the first lens unit barrel 13. Thus, the pair of inner barrier blades 15 is supported to be rotatable around the shafts 151. The shafts 151 are located outside the fitting portions between the barrier drive ring 14 and the first lens unit barrel 13.

When the pair of inner barrier blades 15 comes to be tightly close to each other as illustrated in FIG. 5, a closed stated is achieved to protect the first lens unit 10. The inner barrier blades 15 are biased by not-shown springs to place the inner barrier blades 15 in the closed state.

The inner barrier blades 15 are provided with projections 152, which wall portions (pressing portions) 143 of the barrier drive ring 14 contact. As described above, the barrier drive ring 14 is biased in the counterclockwise direction when the lens barrel 3 is viewed from the object side.

Accordingly, the projections 152 are pressed according to the rotation of the barrier drive ring 14, and the inner barrier blades 15 are shifted to an open state against the biasing force of the springs. The wall portions 143 are located inside the outermost circumferential surface of the first lens unit holder 11 when viewed from the optical axis direction.

The pair of outer barrier blades 16 is arranged at an object side of the inner barrier blades 15. The outer barrier blades 16 include holes 161, which receive shafts 153 coaxial with the shafts 151 of the inner barrier blades 15. The outer barrier blades 16 are thus supported with respect to the inner barrier blades 15.

The outer barrier blades 16 are provided with projections 162 and projections 163 at two portions projecting to an image plane side in the optical axis direction, and peripheral portions of the inner barrier blades 15 engage with the projections 162 and the projections 163. The outer barrier blades 16, thus open and close in association with the opening and closing operation of the inner barrier blades 15.

The barrier cover 17 is held by the first lens unit barrel 13. The barrier cover 17 forms a space in which the inner barrier blades 15 and the outer barrier blades 16 rotate, and has an opening that determines the aperture of the lens barrel 3 when the barrier is open.

The barrier cap 18 is fixed to the barrier cover 17 and the first lens unit barrel 13 by a double-sided adhesive tape or the like, thus accomplishing the lens barrier mechanism.

With reference to FIGS. 1 to 3, the barrier drive ring 14 is provided with projections 144 such that the projections 144 extend toward the image plane side in the optical axis direction and pass through the holes defined in the first lens unit barrel 13 to contact a surface 69 of the moving cam ring 60 (see FIG. 8).

According to the rotation of the moving cam ring 60, the first lens unit barrel 13 moves to a retracted position as illustrated in FIG. 1 to bring the surface 69 to contact with the projections 144. The barrier drive ring 14 thus rotates in a clockwise direction according to the rotation of the moving cam ring 60 when the lens barrel 3 is viewed from the object side.

Accordingly, since the projections 152 of the inner barrier blades 15 are released from being pressed by the wall portions 143 of the barrier drive ring 14, the inner barrier blades 15 are placed in a closed state by not-shown springs, as described above.

As described above, the lens barrel according to the present embodiment includes the first lens unit holder 11 for adjusting the inclination of the first lens unit 10, and the first lens unit adjustment moving ring 12 for changing the position in the optical axis, thus minimizing deterioration of optical performance.

Also, the lens barrier mechanism for protecting the first lens unit 10 is arranged inside the lens barrel 3, and the barrier drive ring 14, which drives the lens barrier mechanism, is arranged such that the barrier drive ring 14 overlaps the first lens unit holder 11 and the first lens unit adjustment moving ring 12 when viewed from the optical axis.

Accordingly, a user can be relieved from a troublesome operation at the time of using a camera. Additionally, the first lens unit barrel 13 and the lens barrel can be prevented from increasing in size in the radial direction.

Furthermore, the rotation shafts of the inner and outer barrier blades, the spring hooks 142 for springs which bias the barrier drive ring 14, and bayonet fitting portions between the barrier drive ring 14 and the first lens unit barrel 13 are arranged between the outer circumference side of the fitting portions between the barrier drive ring 14 and the first lens unit barrel 13 and the outer circumference portion of the first lens unit barrel 13. Thus, the space within the first lens unit barrel 13 can be used efficiently.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-203032 filed Aug. 3, 2007, which is hereby incorporated by reference herein in its entirety.

What is claimed is:

1. A lens barrel comprising:
a first holding member configured to hold a lens;
a second holding member configured to hold the first holding member;
a protection member located at an object side of the lens in an openable and closable manner and configured to protect the lens when in a closed state; and
a drive member configured to open and close the protection member,
wherein the first holding member includes an adjustment surface configured to support the first holding member rotatable with respect to the second holding member around a point located on an optical axis of the lens, and
wherein the drive member is located such that the drive member overlaps the first holding member as viewed from an optical axis direction of the lens.

2. The lens barrel according to claim 1, further comprising a third holding member configured to allow an outer circumference portion of the second holding member to fit therein, wherein the drive member is configured to fit in an inner circumference portion of the third holding member and to be rotatable; and
wherein a fitting portion between the second holding member and the third holding member is located at a position similar to that of a fitting portion between the drive member and the third holding member or is located at a position inside the fitting portion between the drive member and the third holding member as viewed from the optical axis direction.

3. The lens barrel according to claim 2, wherein the protection member is configured to open and close according to a rotation thereof, and a rotation center of the protection member is located at a position outside the fitting portion between the drive member and the third holding member.

4. The lens barrel according to claim 2, further comprising:
an elastic member configured to bias the drive member in a rotation direction; and
an elastic member holding portion configured to hold the elastic member,
wherein the elastic member holding portion is located at a position outside the fitting portion between the drive member and the third holding member.

5. The lens barrel according to claim 2, wherein the drive member includes a flange portion configured to fit in the third holding member, and
wherein the flange portion is located at a position outside the fitting portion between the drive member and the third holding member.

6. The lens barrel according to claim 1, wherein the drive member includes a press portion configured to rotate the protection member by applying pressure thereto, and
wherein the press portion is located at a position inside an outermost circumferential surface of the first holding member.

7. The lens barrel according to claim 2, wherein the second holding member is configured to fit in the third holding member in a rotatable manner and is movable in the optical axis direction with respect to the third holding member according to a rotation position of the second holding member.

8. An imaging apparatus comprising:
an image sensor configured to photoelectrically convert an object image; and
a lens barrel including,
a first holding member configured to hold a lens;
a second holding member configured to hold the first holding member;
a protection member located at an object side of the lens in an openable and closable manner and configured to protect the lens when in a closed state; and
a drive member configured to open and close the protection member,
wherein the first holding member includes an adjustment surface configured to support the first holding member rotatable with respect to the second holding member around a point located on an optical axis of the lens, and
wherein the drive member is located such that the drive member overlaps the first holding member as viewed from an optical axis direction of the lens.

* * * * *